United States Patent [19]
Kaltenbach

[11] 4,335,637
[45] Jun. 22, 1982

[54] CIRCULAR SAW

[76] Inventor: Dieter Kaltenbach, Rebweg 33, 7850 Lörrach, Fed. Rep. of Germany

[21] Appl. No.: 136,040

[22] Filed: Mar. 31, 1980

[30] Foreign Application Priority Data

Apr. 14, 1979 [DE] Fed. Rep. of Germany ....... 2915288

[51] Int. Cl.³ ...................... B23D 45/04; B23D 47/04
[52] U.S. Cl. .................................. 83/452; 83/471.2; 83/471.3; 83/490; 83/484
[58] Field of Search ...................... 83/490, 471.2, 461, 83/574, 471.3, 452, 454, 484; 51/99

[56] References Cited

U.S. PATENT DOCUMENTS

| | | | |
|---|---|---|---|
| 3,105,528 | 10/1963 | Loughridge | 83/490 X |
| 3,483,901 | 12/1969 | Ray | 83/471.3 |
| 3,540,338 | 11/1970 | McEwan | 83/490 |
| 3,715,946 | 2/1973 | Kaltenbach | 83/490 |
| 3,853,028 | 12/1974 | Jägers | 83/461 |
| 4,031,788 | 6/1977 | Boge et al. | 83/490 X |
| 4,031,788 | 6/1977 | Boge et al. | 83/490 X |
| 4,036,092 | 7/1977 | Kaltenbach | 83/471.2 |
| 4,249,443 | 2/1981 | Jagers | 83/490 |

*Primary Examiner*—Donald R. Schran
*Attorney, Agent, or Firm*—Michael J. Striker

[57] ABSTRACT

A cold circular saw has a saw blade displaceable in a substantially vertical feeding direction and also swingable, a clamping device including at least one stationary abutment member and operative for laterally abutting against and holding a workpiece, and an adjustment element for adjusting the saw blade in its plane and in a direction which is transverse to the workpiece feeding direction and to the saw blade feeding direction, as well as relative to the stationary abutment of the clamping device.

25 Claims, 9 Drawing Figures

A-A

A-A

B-B

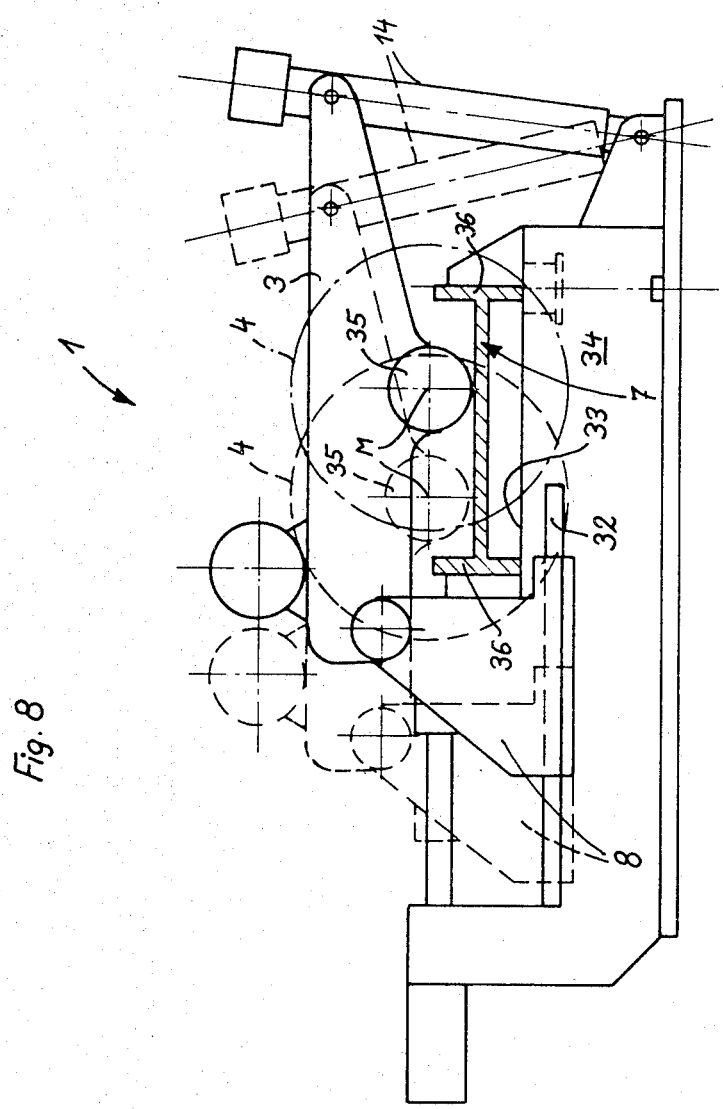

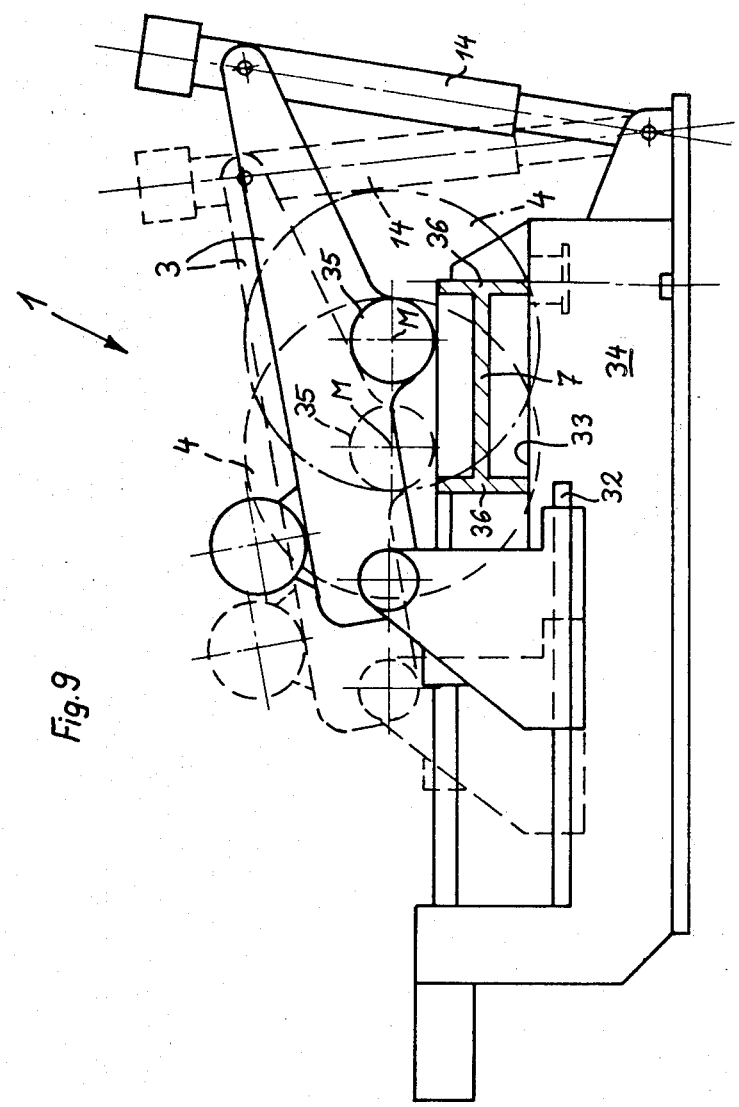

CIRCULAR SAW

BACKGROUND OF THE INVENTION

The present invention relates to a cold circular saw with substantially vertical feeding displacement, particularly with a swingable advantageously from above downwardly saw blade, and provided with a clamping device for abutting and holding a workpiece.

Cold circular saws of the above-mentioned general type are known in the art and designed in different constructions. In known circular saws, either the saw blade reciprocates on a sliding carriage, or the saw blade is arranged on a swinging arm which is movable from above downwardly relative to the saw table or swings from the below upwardly so that the saw blade extends outwardly of the saw table.

When in this machine workpieces having different dimensions are worked and the maximum cutting region of the saw blade is utilized, it is necessary to cut the workpiece arranged centrally to the saw blade axis, e.g. the workpiece must be determined substantially in accordance with the saw blade axis. This leads to the shortest possible displacement of the saw blade and thereby to the shortest possible cutting time.

Since various workpieces have different widths, the clamping arrangements must be respectfully displaced, which is disadvantageous in the case of big machines and long material rods. When inclined cuts are produced, the adjustment of the abutment edge means also a change of the length of the cut, which thereafter must be respectfully set.

SUMMARY OF THE INVENTION

Accordingly, it is an object of the present invention to provide a cold circular saw which avoids the disadvantages of the prior art.

More particularly, it is an object of the present invention to provide a cold circular saw which guarantees that when the centers of a workpiece and saw blade correspond to one another, no expensive adjusting and setting operations are needed when workpieces of different widths are to be cut.

In keeping with these objects and with others which will become apparent hereinafter, one feature of the present invention resides, briefly stated, in a circular saw blade which has a clamping arrangement with at least one stationary abutment member, and in which a saw blade is adjustable in direction transverse to the direction of workpiece feeding movement, to the direction of saw blade feeding movement, and to the stationery abutment member of the clamping device.

In such a construction the once adjusted abutment of the workpiece remains constant, and displacement of a movable part of the clamping arrangement relative to the workpiece and to the stationary abutment is sufficient for clamping the workpiece. The adjustment of the saw blade relative to the work piece center can be obtained by its displacement which is fast and does not affect the position of the workpiece. In the case of inclined cuts, there is also the advantage in that it is not necessary to change the longitudinal abutment for parts which are cut at different angles. At the same time, the cutting region of the saw blade and the shortest feed of the saw blade both for small and high cuts, and for wide and flat cross sections, are utilized.

Moreover, the saw blade in accordance with the invention has a further advantage for the cases when the cut to be sawn exceeds the cutting region of the saw blade, because in accordance with the invention the material may be sawn through in two or more cutting operations between which the saw blade is adjusted in the saw blade plane and transverse to the saw blade feed. During this entire sawing process, the workpiece remains fixedly clamped. It is thereby possible to perform the feed of the saw blade always in vertical direction or alternatively in vertical and horizontal directions.

In accordance with advantageous feature of the present invention, the saw blade is adjustable in the direction transverse to the saw blade feeding direction in stepless manner and is fixable in different positions in which it can be displaced by feeding drive means. As a rule, the transverse adjustment of the saw blade is performed when no sawing process takes place. Thereafter this position is fixed and the circular saw can perform its functions in conventional manner. Particularly, the saw blade can be adjusted in a horizontal direction.

In accordance with still another feature of the present invention, a swinging arm is provided which holds the saw blade and swings preferably from above downwardly, and the swinging arm has a hinge which is arranged in a carriage movable in direction of the saw blade plane transverse to the workpiece. When the saw blade for its feeding displacement is located on a vertical displacable carriage, there is a possibility that the carriage has a supporting member adjustable in a direction transverse to the direction of movement of the carriage, or the carriage itself is arranged on a transverse supporting member.

Yet another advantageous feature of the present invention is that a displacing member is provided at an end of the swinging arm which is opposite to the end provided with the hinge. The displacing member are articulately connected with the free end of the swinging arm and additionally with the machine support and formed by a hydraulic cylinder, spindle, tooth rack or the like. At the same time, the axes of both connections of the displacement element extend parallel to the axis of the hinge of the swinging arm and normal to the displacement of the saw blade. When the saw blade before the sawing process is displaced transversely to its feed for performing an adjustment movement, this can be done with the aid of the hinges of the displacing element without difficulties.

In accordance with a further advantageous feature of the present invention, the circular saw is turnable relative to the stationary abutment about a vertical axis which extends through the surface of the abutment facing toward the workpiece and the plane of one of the saw blade surfaces. Thereby it is possible to turn the machine relative to the machine support and the workpiece abutment for obtaining an inclined cut. Since the cutting point between the material abutment edge and an outer face of the saw blade corresponds to the axis of turning, the work piece cut located on an longitudinal abutment always has the same lengths regardless of the angle of the inclined cut.

It is especially advantageous when the axis of turning is located on the surface plane of the saw blade which faces toward the longitudinal abutment for the workpiece. When inclined cuts with opposite angles must be made, such as in the case of cutting bevels for frame parts, the required identical length of the cuts is attained without expensive adjustment steps.

In order to allow different thicknesses of the saw blade, it is advantageous when the saw blade or its support, particularly the swinging arm carrying the saw blade, can be adjusted and set in direction of the saw blade axis. Thereby the saw blade surface can always be adjusted so that this surface with the workpiece abutment plane exactly in the center of rotation of the machine cuts. For example, the swinging arm on each hinged axis can be adjusted in the direction of this axis and fixed in axial direction.

When it is desired to eliminate a special fixing device for the saw blade holder displacable transverse to the workpiece feed, it is advantageous in accordance with still a further feature of the present invention, to provide a threaded spindle with self-locking for displacement of the saw blade holder and simultaneous fixing of the same in a respective position. When hydraulic or motor-driven means for displacing the saw blade holder is utilized, it is advantageous to use a clamping device.

For attaining automatically the shortest feed of the saw blade for a maximum fast working step of the machine, it is advantageous when the displacement element for the saw blade is provided with end switch for switching a return displacement of the saw blade. An actuating member for this end switch on the machine support may be formed as a curved projection extending through an abutment of the displacement element and movable relative to the end switch. The end switch operates so as to adjust the turning of the displacement element during the displacement of the saw blade in such a manner as to provide a minimum stroke of the saw blade outwardly of the sawn workpiece. The minimum stroke outwardly of the workpiece can be attained when the curve of the actuating member extends convexly away from the machine and upwardly. The farther the saw blade is adjusted relative to the fixed abutment, that is the smaller the cross section of the workpiece to be clamped is, the sooner the abutment of the displacement element reaches the curve, which, in turn, then actuates the end switch. The curvature of the curve takes into account the turning of the displacement element obtained from the displacement of the saw blade.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIGS. 8 and 9 are side views of the cold circular saw in accordance with a further embodiment of the invention.

DESCRIPTION OF THE PREFERRED EMBODIMENTS

Figure 1:
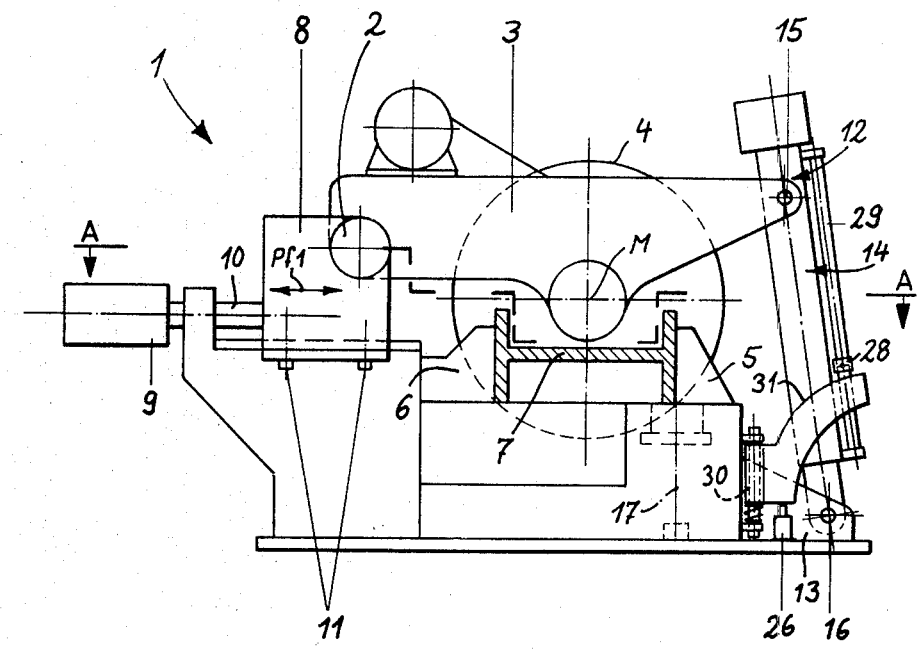
FIGS. 1–3 are side views of a cold circular saw with a swingable saw blade arm which is displacable in a direction transverse to the feeding direction of the saw blade in the plane of the latter and assumes different positions in the figures.

A cold circular saw in accordance with the invention is identified in toto by reference numeral 1 and has a saw blade 4 with vertical feeding displacement. The saw blade 4 is held by a saw blade arm 3 which is swingable from above downwardly about a hinge 2. A clamping arrangement for clamping a workpiece 7 is further provided. The clamping arrangement has a lateral abutment 5 and a movable flange 6 or the like for fixing workpieces of different widths.

In accordance with the invention, the lateral abutment 5 of the clamping arrangement is stationary, and the saw blade 4 or the saw blade arm 3 with the saw blade 4, is adjustable in the saw blade plane and in a direction transverse to the workpiece feeding direction and transverse to the saw blade feeding direction, as well as relative to the stationary abutment 5. In the shown example, the saw blade 4 or the saw blade arm 3 is adjustable in a substantially horizontal direction. The saw blade 4 is adjustable transverse to the feeding direction in stepless manner and can be fixed in different positions. At the same time, in each of these positions, the saw blade 4 is actuated by its feed drive, so that the cold circular saw can perform its usual functions.

Figure 2:
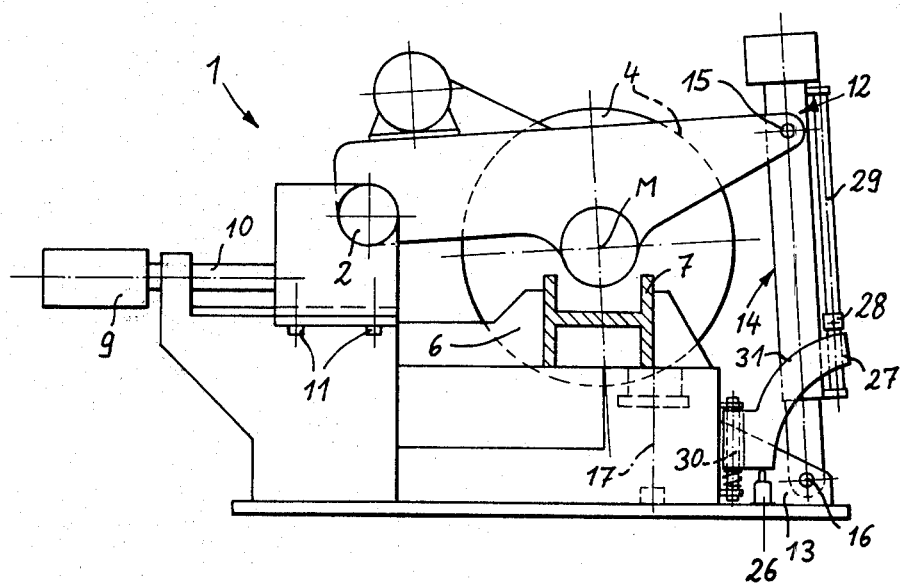

As can be appreciated from the common considerations of FIGS. 1 and 2, this allows the workpiece 7 to always abut against the same stationary lateral abutment 5. Thereby, the saw blade axis M can always be adjusted substantial in correspondence with the workpiece axis. Because of the stationary abutment 5 which facilitates the displacement of the workpiece and setting of the same, the favorable cutting region of the saw blade and the shortest feeding displacement can always be utilized, even when the cross sections of the work piece considerably deviates from one another.

Figure 3:
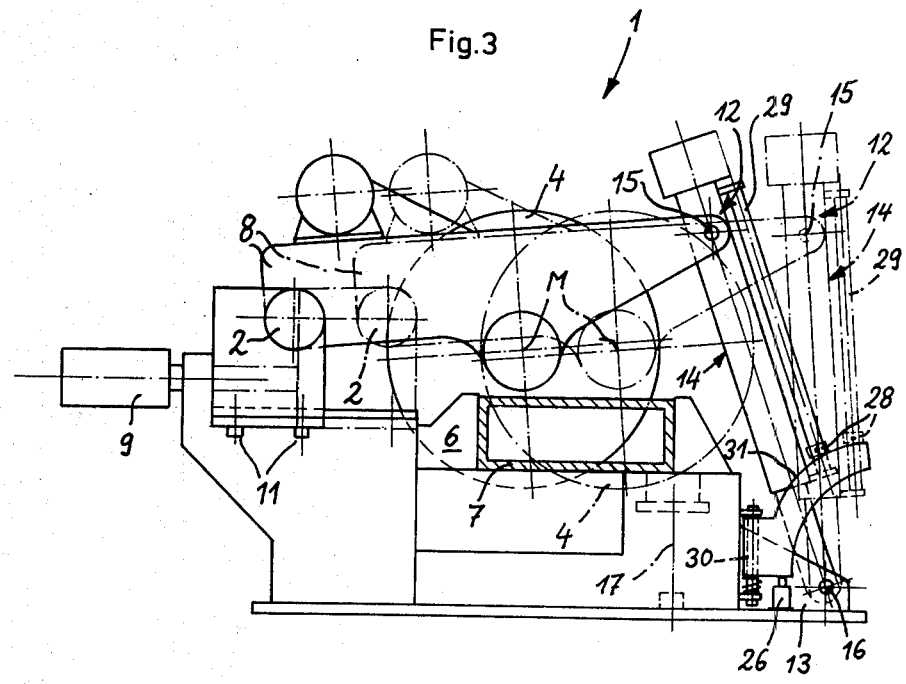

As can be seen from FIG. 3, the displacability of the saw blade arm 3 makes possible to perform for example two successive cuts of the workpiece 7 of such a width which exceeds the cutting region of the saw blade 4. In this case a first cut is first performed. Then the saw blade is brought to initial position and displaced horizontally whereupon a second cut can be performed in order to finally separate the workpiece.

In the shown embodiment of the cold circular saw 1 with the saw blade arm 3, the swivel or hinge 2 of the saw blade arm 3 is arranged on a carriage 8 which is displaceable in direction of the saw blade plane transverse to the work piece, the direction being identified by the arrow Pf1. Thereby the adjusting movement of the saw blade 4 can be performed in a simple manner. The displacement of the saw blade 4 can be performed by a threaded spindle with self-locking, so that no special holding means is needed. Fast displacement can be obtained when a hydraulic or motor means are provided for displacement of the saw blade arm 3, and a fixing device is also provided for fixing the saw blade arm in a respective position. As can be seen from FIGS. 1 and 2, the machine has a motor 9 which actuates a displacement element 10 for the carriage 8, and fixing screws 11. FIG. 3 shows both possible extreme positions, whereas FIG. 1 shows an intermediate position of the carriage 8.

The saw blade arm 3 has a free end 12 which is opposite to the swivel or hinge 2. A displacement element 14 is articulately connected to the end 12 of the saw blade arm 3 and also to a machine support 17. The displacing element 14 may be formed as a hydraulic cylinder-and-piston unit, a spindle cooperating with a nut, a gear rack cooperating with a gear wheel or the like. Pivot axes 15 and 16 of the connections of the displacement element 14 are parallel to the axis of the hinge 2 of the swinging arm 3 and normal to the direction of displacement of saw blade 4 identified by the arrow Pf1. The thus arranged displacement element 14 can, without additional expenses, automatically correspond to the displacement in the direction of the arrow Pf1 and perform its functions in each displacement position. It is advantageous when the displacement element 14 extends between the machine support and the swinging arm substantially in the plane of the saw blade 4, because in this case no torsion moment or the like takes place during the movement of the displacement element 14.

As can be seen from the drawing and particularly from FIG. 1, the entire sawing machine 1 can rotate or turn relative to the stationary workpiece abutment 5 about an axis 17 which is vertical in the shown example. Thereby, the machine 1 can also perform inclined cuts. Because of this stationary workpiece abutment, it is advantageously possible that the axis 17 extends through the surface of the abutment 5, the surface facing toward the work piece 7. This axis can also extend in the plane of one of the surfaces of the saw blade.

In the shown example, the axis of rotation 17 extends in a surface plane 18 of the saw blade 4, which faces toward a not minutely shown longitudinal abutment 7a for the work piece 7. Thereby when the orientation of the inclined position is changed, the cut-off workpiece portion obtains automatically the same lengths, and it is not necessary to adjust during such change of the cutting angle, the longitudinal abutment 7a and the lateral abutment 5. This is advantageous when it is necessary to produce work piece cuts which have the same cut section but are offset relative to one another by 90°. The displaceability of the saw blade 4 has the advantage in that in the case of increase of the inclined position the bevel face will be greater, and thereby the distance between the stationary abutment 5 and the movable flange increases and the saw blade can be adjusted for producing a most favorable cutting region.

Figure 4:
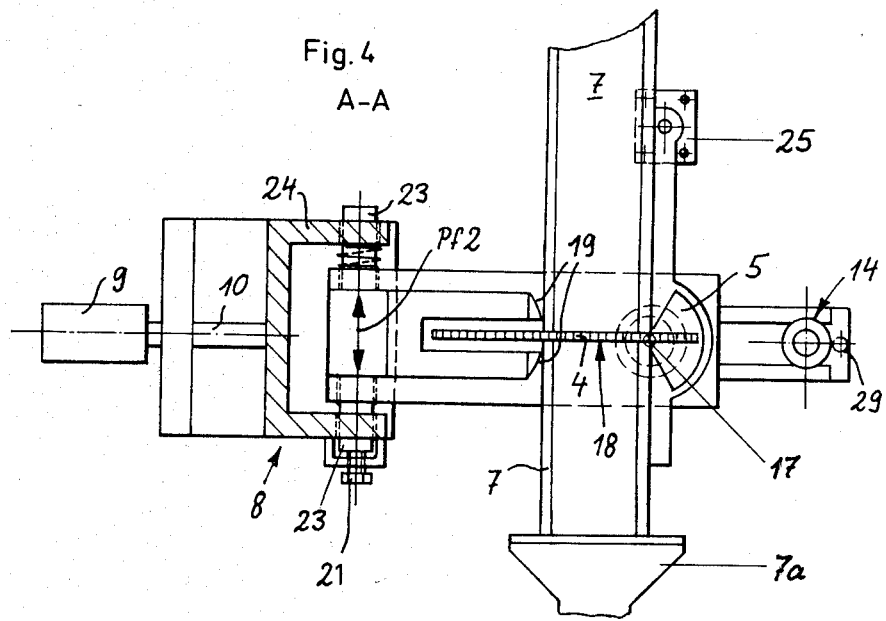
FIGS. 4 and 5 are plane views of the inventive cold circular saw which is turnable about a vertical axis so as to perform inclined cuts, wherein the stationary abutment, as seen from the hinge of the saw blade arm, is arranged behind the saw blade axis.
Figure 5:
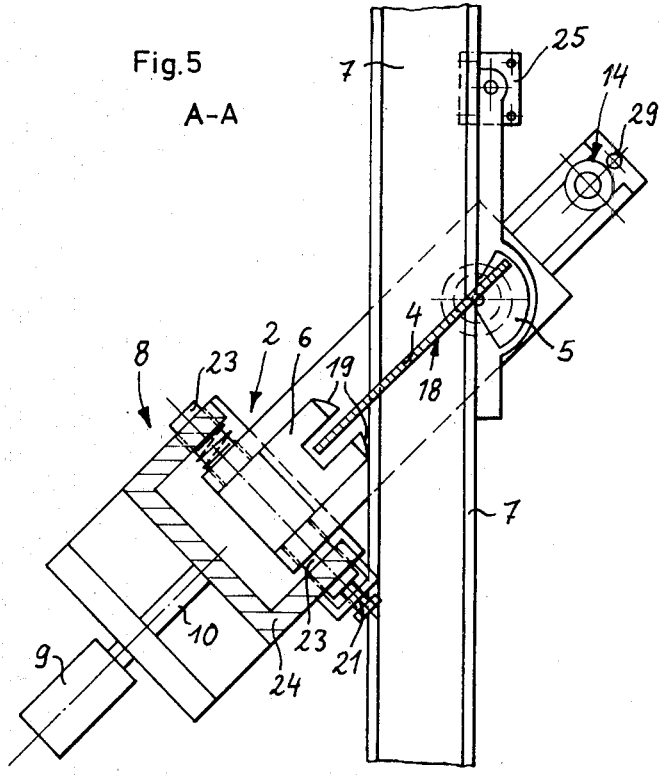

As can be appreciated from FIGS. 4 and 5, the stationary abutment is practically formed as a circular segment whose center tip forms the abutment and is pierced by the vertical axis 17. Abutment faces 19 of the movable flange are rounded in order to match to different inclined positions in a simple manner.

As shown in FIG. 4, the saw blade 4 or in the shown example its holder, that is the swinging arm 3, can be adjusted and set in the direction of the saw blade axis. This is provided in order to guarantee that the axis 17 always extends in the surface plane 18 of the saw blade 4 when saw blades of different thicknesses are inserted. In such a construction the swinging of saw blade arm 3 is adjustable on its hinge 2 in its direction and is fixable in axial direction with the aid of an adjusting screw 21. An end 22 of the saw blade arm 3 located in the hinge 2 has two ends 23 for forming a hinge axle. They have play inside a fork-shaped support 24 of the hinge 2 such that the fitting of saw blades of different thicknesses in the direction of the arrow Pf2 is possible without difficulties. The support 24 is substantially the carriage 8.

Figure 6:
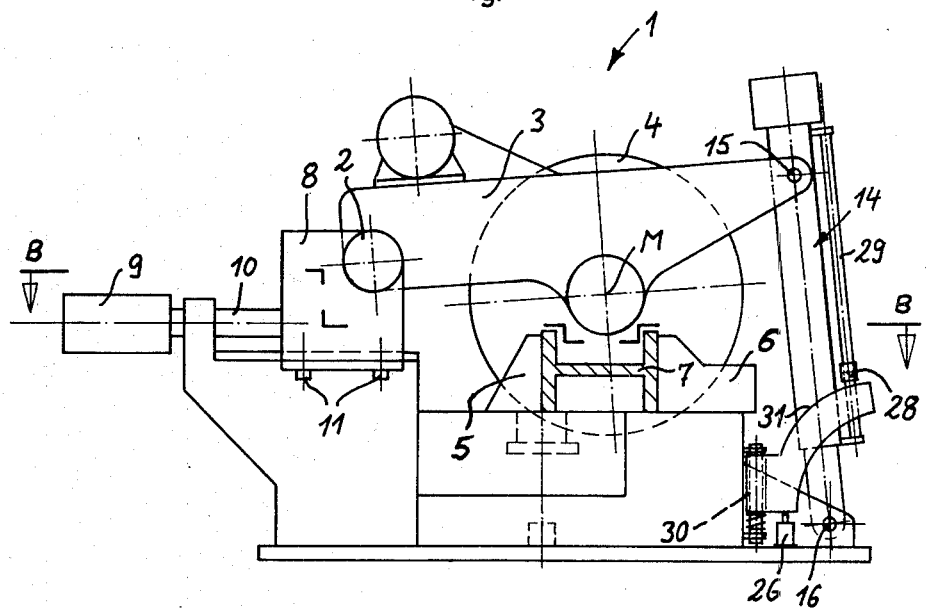
FIGS. 6 and 7 are side and plan views of the inventive cold circular saw in which the stationary abutment and the vertical axis of turning of the machine, as seen from the hinge of the saw blade arm, are arranged in front of the saw blade axis.
Figure 7:
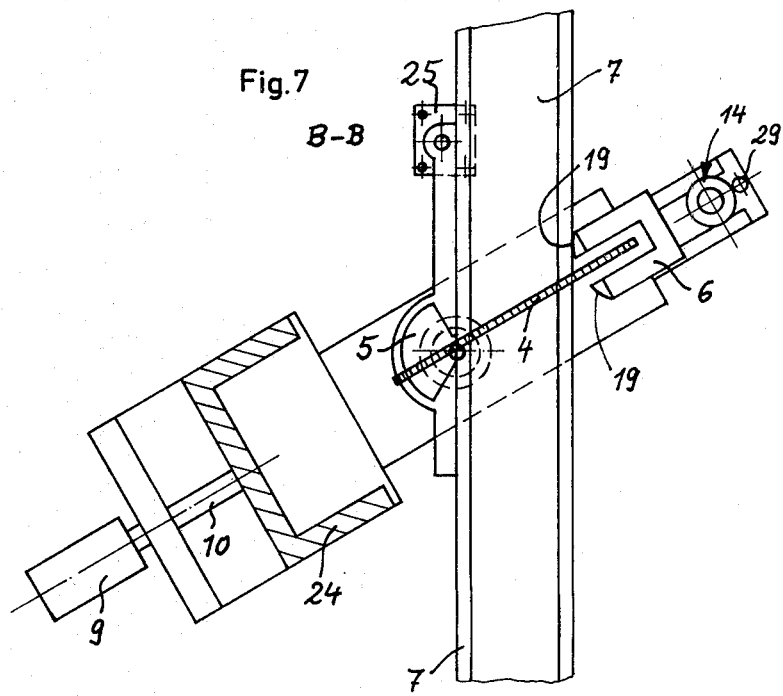

As can be seen from the drawing, the stationary abutment 5 relative to which the machine 1 can rotate about the axis 17, is secured against rotation by a fixed member 25 which is anchored outside of the machine 1. The stationary abutment 5 shown in FIGS. 1-5 is located at the side of the saw blade axis M, which is opposite to the side wherein the swivel or hinge 2 is located. FIGS. 6 and 7 show that an opposite arrangement of the stationary abutment 5 is also possible. The stationary abutment 5 shown in FIGS. 6 and 7 is located adjacent to the hinge 2, whereas the movable part of the clamping arrangement is located adjacent to the displacing element 14. In this case greater displacements of the movable member of the clamping arrangement are allowed.

As can be seen from FIGS. 1-3, an end switch 26 is provided in the region of the displacement element 14. The end switch 26 serves for switching the saw blade 4 to perform a return stroke when the workpiece is completely separated. Thereby, the saw blade 4 moves outwardly beyond the separated workpiece only to a smallest possible distance. An actuating element for the end switch 26 is formed by a curved projection 27 arranged on the machine support and movable through an abutment 28 of the displacing element. In the shown example, the projection 27 moves through the abutment 28 which is arranged on a rod 29 of the displacement element 13.

The projection 27 is supported in a vertical guide 30 and advantageously displaceable against a counterforce. A curved 31 of the projection 27 which cooperates with the abutment 28 adjusts the returning of the displacement element 14 during displacement of the saw blade 4 so as to provide a minimum stroke of the saw blade 4 outside the sawn workpiece 7. As can be seen from the drawing, the curve 31 is convex in the direction away from the machine 1 and upwardly which provides for sufficient correspondence to the turning of the displacement element and thereby the joint movement of the abutment 28 during the displacement of the saw blade.

The cold-circular saw provided with such an end switch is advantageous since it has an automatically protected construction, in-as-much as on the one hand, an automatic adaptation of the sawing machine to the displacability of the saw blade for adaptation to workpieces of different widths and, on the other hand, the simultaneous adjustment of the smallest saw blade feeding stroke and the fastest switching to the saw blade return are possible. Moreover, when the sawing machine is rotatable, it possesses the advantage in that in the case of inclined cuts, the produced sections have identical lengths regardless of the angle of the inclined cuts, without providing expensive setting steps for changing the angle of the inclined cuts.

FIGS. 8 and 9 show the cold circular saw in accordance with a different embodiment of the invention. In this cold saw blade 1a guide 32 for the carriage 8 is arranged substantially at the side of an upper edge 33 of a saw table 34 on which the workpiece 7 is placed. In the shown example, the guide 32 lies somewhat deeper than the upper faces 33 of the saw table 34. This arrangement has the advantage in that with the same cutting region a greater stability of the machine and a shorter length of the construction, or in the case of the same length of construction greater cutting region can be obtained. This is especially true for cuts in which the saw blade during a separation process moves both vertically and horizontally as shown in both embodiments.

It can be appreciated that a hub 35 of the saw blade located in the region of the axis M is well dipped between outer webs 36 of the work-piece 7. At the same time, the region of the saw blade 4 located outside of the hub 35 can completely pierce a very wide workpiece by downward swinging and horizontal displacement. Simultaneously, the abovementioned arrangement of the guide provide for a favorable passage of reaction force from the saw blade to the machine frame. Moreover, the guide extending below the saw table is longer and thereby can be more stable.

It will be understood that each of the elements described above, or two or more together, may also find a useful application in other types of constructions differing from the types described above.

While the invention has been illustrated and described as embodied in a cold circular saw, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A cold circular saw for cutting a workpiece displaceable in a workpiece feeding direction, the cold circular saw comprising a machine support; a saw blade extending in a predetermined plane, said saw blade being displaceable in a substantially vertical saw blade feeding direction and also being swingable; means for clamping a workpiece and operative for laterally abutting against and holding the workpiece, said clamping means including at least one stationary abutment member; a swingable supporting arm arranged to support said saw blade and having one free end portion provided with a hinge for swinging said supporting arm; said supporting arm has another free end portion which is opposite to said one free end portion and further comprising a displacing element articulately connected with said other free end portion of said supporting arm and with said machine support and a carriage on which said hinge of said supporting arm is mounted, said carriage being displaceable in an adjusting direction on said plane of said saw blade and transverse to a workpiece feeding direction, relative to said machine support and said workpiece clamping means.

2. A cold circular saw as defined in claim 1, wherein said saw blade is swingable from above downwardly.

3. A cold circular saw as defined in claim 1, wherein said saw carriage is displaceable in said adjusting direction in a stepless manner between a plurality of positions and fixable in each of said positions; and further comprising fixing means operative for fixing said carriage in each of said positions.

4. A cold circular saw as defined in claim 1; and further comprising a support member which supports said carriage and is adjustable in a direction which is transverse to the direction of displacement of said carriage.

5. A cold circular saw as defined in claim 1; and further comprising a transverse support member extending in a direction which is transverse to the direction of displacement of said carriage, said carriage being arranged on said transverse support member.

6. A cold circular saw as defined in claim 1, wherein said displacing element extends between said swinging arm and said machine support in said plane of said saw blade.

7. A cold circular saw as defined in claim 6 wherein said displacing element is a hydraulic cylinder-and-piston unit.

8. A cold circular saw as defined in claim 6, wherein said displacing element includes a spindle.

9. A cold circular saw as defined in claim 8, wherein said spindle of said displacing element is a threaded self-locking spindle.

10. A cold circular saw as defined in claim 6, wherein said displacing element includes a gear rack.

11. A cold circular saw as defined in claim 1, wherein said stationary abutment member has a surface facing toward the workpiece, said saw blade having two opposite surfaces; and further comprising means for turning said saw blade relative to said stationary abutment member about a vertical axis which extends through said surface of said stationary abutment member and in a plane extending through one of said surfaces of said saw blade.

12. A cold circular saw as defined in claim 10; and further comprising means for securing said stationary abutment relative to which the saw with said saw blade turn, said securing means including an anchoring member arranged outside the saw and securing said stationary abutment member.

13. A cold circular saw as defined in claim 11, wherein said one surface of said saw blade, in which said vertical axis of turning of said saw blade extends is a surface which faces toward the workpiece.

14. A cold circular saw as defined in claim 1, wherein said saw blade has an axis of rotation and is arranged to be adjusted and set in the direction of said axis of rotation.

15. A cold circular saw as defined in claim 1, wherein said saw blade has an axis of rotation, said swinging arm being arranged to be adjusted and set in the direction of said axis of rotation.

16. A cold circular saw as defined in claim 15, wherein said hinge has an axis, said swinging arm being displaceable in the direction of said hinge axis and fixable in said direction.

17. A cold circular saw as defined in claim 1, wherein said saw blade has an axis of rotation, said hinge being arranged at one side of said axis of rotation, whereas said stationary abutment member is arranged at the opposite side of said axis of rotation.

18. A cold circular saw as defined in claim 1; and further comprising means for switching displacement of said saw blade in said saw blade feeding direction to a return displacement of said saw blade, said switching means including an end switch arranged adjacent to said displacing element.

19. A cold circular saw as defined in claim 19, wherein said displacing element turning during the displacement of said saw blade, said switching means further including curved actuating member provided on said machine support, said actuating member being connected with said displacing element and movable relative to said end switch so as to actuate the latter, said end switch being operative for adjusting the turning of the displacement element so as to provide a minimum passage of said saw blade outwardly beyond the sawn workpiece.

20. A cold circular saw as defined in claim 19, wherein said displacement element has an abutment, said curved actuating member extending through said abutment of said displacing element.

21. A cold circular saw as defined in claim 20, and further comprising a machine support, said curved actuating member being convex upwardly away of said machine support.

22. A cold circular saw as defined in claim 20, wherein said switching means further including a vertical guide member in which said actuating member moves in a first direction toward said end switch, and means for urging said actuating member in a second direction which is opposite to said first direction.

23. A cold circular saw as defined in claim 1; and further comprising a table arranged to support the workpiece and having an upper surface, and a guiding element arranged for guiding said carriage and located at a height substantially corresponding to that of said upper surface of said table.

24. A cold circular saw as defined in claim 1; and further comprising a table arranged to support the workpiece and having an upper surface, and a guiding element arranged for guiding said carriage and located at a height which is smaller than that of said upper surface of said table.

25. A cold circular saw as defined in claim 20, wherein said table extends over a predetermined region, said guiding element extending to a region located below said region of said table.

* * * * *